Dec. 3, 1935.   H. S. EBERHARD   2,022,651
TRACTOR
Filed Sept. 8, 1930
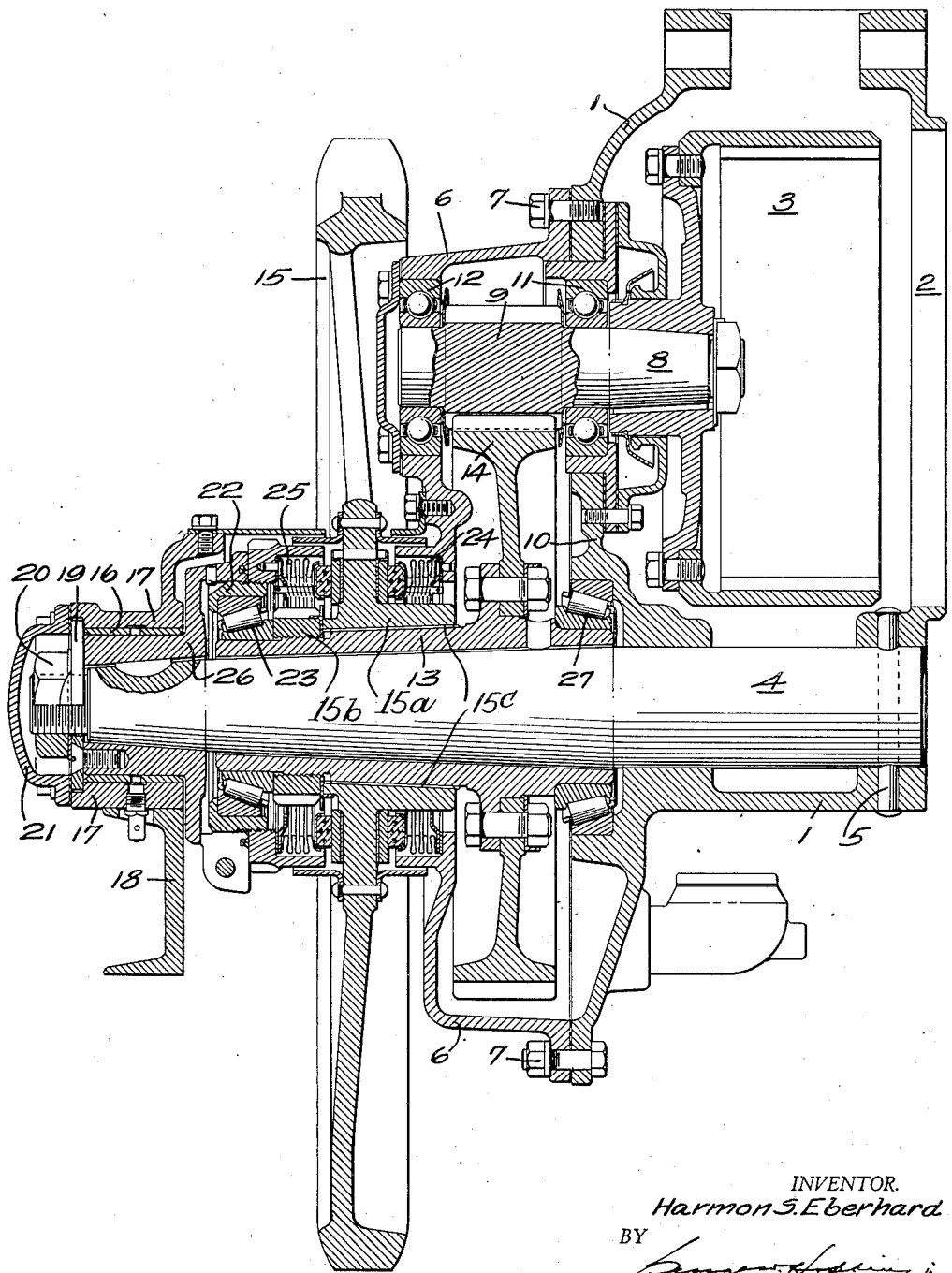
INVENTOR.
Harmon S. Eberhard
BY
ATTORNEYS.

Patented Dec. 3, 1935

2,022,651

UNITED STATES PATENT OFFICE 2,022,651

TRACTOR

Harmon S. Eberhard, San Leandro, Calif., assignor to Caterpillar Tractor Co., San Leandro, Calif., a corporation of California Application September 8, 1930, Serial No. 480,448

23 Claims. (Cl. 180—9.1)

The invention relates particularly to driving mechanism for the tracks of a track type tractor.

In one type, the truck frame bearing the trucks which ride upon the track rails is pivoted to the tractor at a point on the axis of the driving sprocket. While this arrangement has certain advantages for tractor operation, it presents difficulties in practical construction.

The objects of this invention are to provide the driving sprocket and other rotating parts with adequate bearings and supports, to arrange the parts of the mechanism for compactness to economize the use of space and material and at the same time obtain a construction which can be economically manufactured, and which will be rugged and durable in service.

The figure is a section in a vertical plane transversely of the sprocket showing the improved arrangement and construction of it and its related parts.

The tractor includes a final drive housing 1, which is adapted to be rigidly fastened to the transmission case (not shown) of the tractor. Such housing, thus rigidly attached, forms with the transmission case a unit frame or backbone construction, which constitutes the frame of the machine. Aperture 2 accommodates connections to the interior of the transmission case of the tractor not shown. Member 3 within housing 1 is the driven member of the clutch. Shaft 4 is mounted in the lower portion of housing 1 and prevented from rotating by pin 5.

Housing 1 is provided with a cap 6 fastened thereto as shown at 7.

Clutch member 3 is fastened to shaft 8 which bears pinion 9, preferably formed integrally therewith. Wall 10 of housing 1 is apertured to receive shaft 8 and its bearing 11. A second bearing 12 is located in the cap 6. The pinion shaft and clutch member unit is supported on bearings in the housing and its cap.

Encompassing shaft 4 is a tapered quill 13 which rotates about but does not contact shaft 4 and is provided with a bearing 27 in wall 10 of housing 1. Cap 6 is apertured to permit portions of the shaft and quill to extend outside. Fastened to quill 13 is gear 14 engaging pinion 9. Sprocket wheel 15 is also fastened to quill 13 by virtue of tapered hub 15a wedged onto tapered quill 13 by nut 15b; the hub 15a and the quill 13 having a splined connection 15c. The sprocket wheel engages the links of the track not shown.

Keyed upon the end of shaft 4 is a member 26 which bears a bushing 16 for a journal 17 attached to truck frame 18. Journalled on frame 18 are the usual trucks for engagement with the track rails, all not shown. The journal is maintained in place by washer 19 and nut 20 and the end is sealed with a cap 21. Since the truck frame 18 is supported on the rails of the track which engages the ground, it is apparent that shaft 4, fixed in housing 1, supports the housing and the transmission case (both of which form the frame of the tractor) on the truck frame. Due to the pivotal connection at 16, the truck frame can swing relative to the tractor frame and vice versa.

Member 26 is extended inwardly to receive a support 22 for a bearing 23 for quill 13. The outer end of the quill is by this means carried by stationary shaft 4.

To protect the parts against foreign matter and also to prevent egress of oil, seals are placed between the sprocket and the cap 6, at 24, and the parts fastened to shaft 4, at 25. In addition the seals are protected by overlapping shields fastened to the sprocket and to the stationary parts adjacent, as shown.

It is to be particularly noted that quill 13, its gear 14 and the sprocket 15, rotating as a unit, are advantageously provided with bearings placed well apart and entirely outside and on either side of the zone of rotating mass represented by the gear and the sprocket.

I claim as my invention:

1. In a tractor having a case and a truck frame, a shaft positioned between said case and said truck frame, means to provide a hinge support for said frame about said shaft, a driving unit including a quill encompassing said shaft, and a sprocket on said quill, a bearing positioned on said quill between said quill and said case, and a second bearing positioned between said quill and a member carried by said shaft outside of said case.

2. A tractor drive comprising a housing, a shaft extending from said housing, and a functionally integral unit including a quill, a drive gear interiorly of said housing, and a sprocket exteriorly of said housing, said unit encompassing a portion of said shaft, means within said housing providing a journal for said unit, and means outside of said housing and carried by said shaft laterally beyond both said drive gear and said sprocket for providing another journal for said unit.

3. A tractor drive comprising a housing, spaced bearings, a shaft mounted in said housing, and a functionally integral unit including a quill, a drive gear interiorly of said housing, and a sprocket exteriorly of said housing, said unit being journalled for rotation about said shaft with both said drive gear and said sprocket located between said bearings, the bearing adjacent the sprocket being carried by said shaft.

4. A tractor drive comprising a truck frame, a supporting frame, a shaft hinging said truck frame relative to said supporting frame, a rotatable unit positioned coaxially with said shaft and rotatable about said shaft, and bearing means for journalling said unit for support on said supporting frame and on said shaft at a location adjacent said truck frame.

5. In a tractor; a housing; a driving unit comprising a rotatable quill projecting from a position within to a position without the housing, a gear in the housing and mounted for rotation with said quill, and a wheel without the housing and mounted for rotation with the quill; a bearing on the housing in which the quill is journalled; a bearing without the housing and spaced from the outer face of said housing for journalling the quill; a shaft passing through said quill and serving as a support for said bearing without the housing; and a truck frame pivoted about said shaft and adjacent the bearing without the housing.

6. In a tractor; a housing; a driving unit comprising a rotatable quill projecting from a position within to a position without the housing, a gear in the housing and mounted for rotation with said quill, and a wheel without the housing and mounted for rotation with the quill; a shaft connected to said housing and extending through said quill; spaced journal means for the quill between which the gear and the wheel are positioned, one of said journal means being within the housing, another of said journal means being carried by said shaft without and spaced laterally from the outer face of the housing; and a truck frame pivoted about the axis of said shaft.

7. In a tractor, a frame, a rotatable driving unit, a bearing in said frame and in which the unit is journalled, said unit projecting outside said frame, a shaft projecting freely through said unit, a second bearing for journalling the unit outside said frame, a member on said shaft and in which the second bearing is mounted, and a truck frame pivoted about said shaft.

8. In a tractor, a frame, a rotatable quill, a bearing in said frame and in which the quill is journalled, said quill projecting beyond said frame, a shaft projecting freely through said quill, a second bearing for journalling the quill beyond said frame, a member on said shaft and in which the second bearing is mounted, a gear and a wheel mounted for rotation with said quill and positioned between said bearings, and a truck frame pivoted about said shaft.

9. In a tractor, a frame, a rotatable quill, a bearing in said frame and in which the quill is journalled, said quill projecting beyond said frame, a shaft projecting freely through said quill, a member on said shaft, a second bearing in said member in which the quill is journalled, a truck frame, and means for pivoting the truck frame about the axis of said member.

10. In a tractor, a housing, a rotatable driving unit, a bearing in said housing and in which the unit is journalled, said unit projecting from within to a position without the housing, said unit including a gear within the housing, and a wheel without the housing, a shaft projecting freely through said unit, a member on said shaft, a second bearing in said member in which the unit is journalled, a truck frame, and means for pivoting the truck frame on said member.

11. In a tractor, a housing, a shaft supported by said housing and projecting without said housing, a rotating unit, a bearing seated within said housing supporting said unit on said housing, a member supported by said shaft outside of said housing, and a second bearing seated in said member and in which the unit is supported for rotation.

12. In a tractor, a housing, a member mounted in said housing and extending outwardly therefrom, a driving unit partly within the housing and partly without the housing and rotatable about said member, journal means seated in a wall of said housing for supporting said unit, and second journal means mounted on said member and engaging an external bearing surface of said unit.

13. In a tractor; a housing; a driving unit, projecting from a position within to a position without said housing, a bearing between said unit and said housing, a shaft connected to said housing and extending through said unit, a second bearing without the housing connected to said shaft for supporting said unit, and an auxiliary frame connected to said shaft and adjacent said second bearing for supporting the tractor on the ground.

14. In a tractor, a frame, a shaft connected to said frame, a driving unit, a bearing about said unit and in which said unit is journalled, and an intermediate member between said shaft and said bearing whereby load is transmitted between said bearing and said shaft only through said member.

15. In a tractor, a frame, a shaft connected to said frame, a driving unit, a bearing for said unit, an intermediate member between said shaft and said bearing whereby load is transmitted between said bearing and said shaft only through said member, and a second bearing between said unit and said frame, said second bearing being seated in said frame around said shaft, said frame providing the only connection between said second bearing and said shaft.

16. In a tractor, a support, a frame, a driving unit, bearing means between said unit and said support, bearing means between said frame and said unit, and a shaft connected to said support extending through said unit and providing a mounting for said frame.

17. In a vehicle, a vehicle frame member, a shaft extending therefrom, a driving unit including a tubular member rotatable about said shaft, journal means supporting one portion of said tubular member on said vehicle frame member to transmit load directly thereto, other journal means for said tubular member, and means supporting said other journal means by said shaft.

18. In a vehicle, a vehicle frame member, a shaft extending therefrom, a driving unit including a tubular member spaced free of contact with and rotatable about said shaft, journal means supporting one end portion of said tubular member on said vehicle frame member to transmit load directly thereto, other journal means for the opposite end portion of said tubular member and supported by said shaft, and an additional frame member connected with said shaft adjacent said other journal means.

19. In a vehicle; a frame; means transmitting a drive from said frame comprising a driving unit rotatable about an axis and including a tubular member, a gear rotatable with said tubular member, and a wheel spaced from said gear and rotatable with said tubular member; a shaft secured to said frame and projecting outwardly from said frame through said tubular member;

journal means associated with said frame at one side of both said gear and said wheel supporting said unit for rotation; second journal means for said driving unit supported by said shaft and located at the opposite side of said gear and said wheel whereby the gear and wheel are both positioned between said first-mentioned and said second-mentioned journal means; and means movably connected to said shaft for supporting said vehicle on the ground.

20. In a vehicle; a frame; means transmitting a drive from said frame comprising a driving unit rotatable about an axis and including a tubular member, a gear rotatable with said tubular member, and a wheel spaced from said gear and rotatable with said tubular member; a shaft secured to said frame and projecting outwardly from said frame through said tubular member; journal means associated with said frame at one side of both said gear and said wheel supporting said unit for rotation; a journal member secured to said shaft and located at the opposite side of said gear and said wheel; second journal means for said driving unit mounted in said journal member and engaging an exterior surface of said tubular member, both the gear and the wheel being positioned between said first-mentioned and said second-mentioned journal means; and means movably connected to said shaft at a location adjacent the journal member for supporting said vehicle on the ground.

21. In a track-type tractor, a tractor body, a shaft connected to said body, driving means for said tractor including a tubular member rotatable about the axis of said shaft and a sprocket wheel rotatable with said tubular member, means for rotatably supporting said tubular member comprising a bearing adjacent said body at one side of said wheel and another bearing spaced from said first mentioned bearing and supported by said shaft at the opposite side of said wheel whereby said wheel is positioned between said bearings, and means movable relative to said tractor body for supporting said body on the ground.

22. In a track-type tractor, a tractor body, means for supporting said tractor body on the ground, means for movably connecting said supporting means to said body including a shaft connected to said body, driving means for said tractor including a tubular member rotatable about the axis of said shaft and spaced wheels rotatable with said tubular member, and means for rotatably supporting said tubular member comprising a bearing adjacent said body at one side of said wheels and another bearing spaced from said first mentioned bearing and supported by said shaft at the opposite side of said wheels whereby said wheels are positioned between said bearings.

23. In a track-type tractor; a tractor body; a truck frame; means for hingedly connecting said truck frame to said body including a shaft connected to said body; driving means for said tractor including a tubular member rotatable about the axis of said shaft, and a sprocket wheel and a drive transmitting wheel rotatable with said tubular member; and means for rotatably supporting said tubular member comprising a bearing adjacent said body at one side of both said sprocket wheel and said drive transmitting wheel, and another bearing spaced from said first mentioned bearing and supported by said shaft at the opposite side of both said sprocket wheel and said drive transmitting wheel whereby the sprocket wheel and the drive transmitting wheel are both positioned between said bearings.

HARMON S. EBERHARD.